United States Patent [19]

Robles Akesolo

[11] Patent Number: 5,744,871
[45] Date of Patent: Apr. 28, 1998

[54] WIND SYSTEM FOR ELECTRIC POWER GENERATION

[76] Inventor: Miguel Angel Robles Akesolo, 09511 Mijala de Losa, Burgos, Spain

[21] Appl. No.: 624,455

[22] PCT Filed: Jul. 28, 1995

[86] PCT No.: PCT/ES95/00093

§ 371 Date: Apr. 4, 1996

§ 102(e) Date: Apr. 4, 1996

[87] PCT Pub. No.: WO96/04479

PCT Pub. Date: Feb. 15, 1996

[30] Foreign Application Priority Data

Aug. 5, 1994 [ES] Spain ................................. 9401773

[51] Int. Cl.$^6$ ................................................ F03D 5/02
[52] U.S. Cl. ................... 290/55; 415/2.1; 416/8; 290/44
[58] Field of Search ................. 290/55, 44; 416/7, 416/132 B; 415/5

[56] References Cited

U.S. PATENT DOCUMENTS

| | | | |
|---|---|---|---|
| 1,292,389 | 1/1919 | Cook | 416/8 |
| 2,245,264 | 6/1941 | Dunn . | |
| 2,599,435 | 6/1952 | Cumming | 244/4 R |
| 4,175,910 | 11/1979 | Nilberg | 416/8 |
| 4,303,834 | 12/1981 | Li | 290/55 |
| 4,494,008 | 1/1985 | Patton | 290/44 |
| 4,536,125 | 8/1985 | Herman et al. | 415/5 |
| 4,859,146 | 8/1989 | Labrador | 416/8 |
| 5,134,305 | 7/1992 | Senehi | 290/55 |

FOREIGN PATENT DOCUMENTS

| | | |
|---|---|---|
| 2394689 | 1/1979 | France . |
| 4142217 | 7/1993 | Germany . |
| 4142417 | 7/1993 | Germany . |
| 8707587 | 7/1985 | Spain . |
| 2131490 | 6/1984 | United Kingdom . |

Primary Examiner—Steven L. Stephan
Assistant Examiner—Nicholas Ponomarenko
Attorney, Agent, or Firm—Helfgott & Karas, P.C.

[57] ABSTRACT

The system is provided with a number of blades (3) having a biconvex profile and transversely connected to the outside of a flexible transmission line (2) comprised by two or more elements, preferably steel cable, defining what could be deemed to be a closed belt of any geometric shape, according to the characteristics of the prevailing winds, size or power of the system and lie of the land. These flexible elements of the transmission line are guided in pulleys (6) that are mounted on the shaft (7) of respective alternators (8), to which the energy is transferred. The alternators (8) are mounted on vertical towers or columns (1) through articulated supports (9), and the alternators (8) and their respective pulleys (6) can therefore be arranged inclined in relation to the towers.

3 Claims, 3 Drawing Sheets

WIND SYSTEM FOR ELECTRIC POWER GENERATION

OBJECT OF THE INVENTION

The present invention relates to a wind system, of the kind fitted with a number blades vertically attached to a closed flexible belt, which extracts energy from the wind impinging on the blades and transfers it to a number of alternators for its conversion into electric power.

The wind system subject of the invention is devised to generate electric power industrially and with a high efficiency.

BACKGROUND OF THE INVENTION

Apparatus using wind energy for its conversion into electric power can be deemed to be divided into two large groups, the so-called "vertical axis" and "horizontal axis" groups.

With regard to horizontal electric power generating apparatus and systems, although plants are currently in operation, such are very complex for they need to be able to rotate about themselves, much like a weather-vane, and hence need to have devices ensuring that they face into the wind at all times. The rotor must also be provided with blade pitch regulation systems, each blade rotating about its own axis, in order to keep the revolutions of the turbine constant regardless of the wind velocity. A multiplication box is also required to adapt the turbine revolutions, of about tens of revolutions per minute, to those of the alternator, between 700 and 3000 revolutions per minute. Considering the above and the large size of these machines, the investment cost required rockets and making it pay and exploiting it is therefore difficult.

It is finally noteworthy that these systems operate only under very heavy winds wherefore their installation is limited to just a few geographical locations and their use as a power generation system can never be widespread.

Currently known vertical systems and apparatus are inconvenient in two significant ways, since they must firstly be installed, much like horizontal axis systems and apparatus, in areas with a high wind potential and, secondly, their output is below that of the horizontal axis systems aforesaid, wherefore they cannot be deemed to be industrially effective power obtention systems.

A third family exists in which the system of the invention could fit, namely all systems having no axis. Among these reference could, for instance, be made to U.S. Pat. No. 4,175,910 and GB Patents 2,131,490 and 2,131,491. U.S. Pat. No. 4,175,910 relates to a wind system comprising two parallel cables passing through two pairs of pulleys to define two closed parallel loops. A number of aerodynamic profiled blades are mounted between these two cables vertically, arranged in such a way that wind impinging upon the blades causes the cables to move. As the patent specification clearly discloses, the system was devised to work as a wind blanket and secondly as a potential source of domestic power.

GB Patents 2,131,490 and 2,131,491 relate to plants having a number of posts or pivots arranged as vertices of a polygon, each acting as a common shaft for two top and bottom pulleys through which two closed cables pass defining two horizontal closed and parallel loops. Patent 2,131,491 discloses a number of aerodynamic profiles arranged vertically between both loops upon which the wind impinges to cause the blades and hence the cables to move. This linear movement of the cables causes an angular movement of the pivots which may be converted into useful energy. In Patent 2,131,490, the aerodynamic profiles are replaced with sails of flexible material.

Although these systems are theoretically feasible, they are variously inconvenient and therefore scarcely practical if a plant of suitable dimensions is to be made to obtain electric power providing a sufficient output and efficiency in order for an acceptable profitability to be achieved. Thus, for instance, a realistic plant would require columns over 20 meters high and several tonnes in weight, and the pulleys turning with the column would therefore also have huge dimensions and require a revolution multiplier group. The cost and complexity of these plants would therefore be such as to render them wholly impractical to obtain electric power industrially.

Another disadvantage of the plants described in the Patents aforesaid lies in the manner in which the blades are mounted on the cables, for their length is limited to the existing distance between the cables and such may not be too large due to the centrifugal force. Bearing in mind that there is a resistance phenomenon to the forward movement of the edges in any blade working by lift having a fixed value for each blade, then clearly the longer the blades the smaller the number of blades required, the smaller the number of marginal edges and the greater the efficiency. With a construction as described, the blades are of little length and plant efficiency will not hence be optimum.

DESCRIPTION OF THE INVENTION

The wind system subject of the invention fully solves the disadvantages aforesaid, and is designed to generate electric power industrially very profitably.

The system is structurally based upon a number of vertically arranged blades having a biconvex symmetrical profile with a constant thickness and chord in plan all along their length, as the profile of the vertical axis machines of Giromill and Darrius. These blades are fixed transversely on a flexible transmission line forming a unit that travels horizontally along a closed path or belt.

The transmission line shall comprise two or more flexible elements, preferably steel cables, and may use any geometric configuration whatsoever for the closed belt, i.e. a closed polygonal line, a rectangular return contour, etc., to adapt to local wind characteristics and the lie of the land.

The blades and the flexible transmission line are always connected between the inner face of the blade and the outside of the cable, spacer elements being used to prevent contact between the blades and the pulleys. With a connection of this kind, the vertical length of the blades can be longer than the distance between the cables of the transmission line, and it is therefore possible to construct blades of great length connected to several transmission lines in lieu of using a blade between every two transmission lines, thereby reducing the number of blades required and consequently the induced resistance generated at their marginal edges. Similarly, since the number of blades is reduced, so is the number of cables, pulleys, generators and anchorings required, and the cost of the plant is therefore also minimised.

Furthermore, since a blade of great length can be constructed as a single part instead of using several aligned smaller blades, a better performance is achieved as a beam to withstand the centrifugal force generated when the blade goes round the pulley.

The flexible cables or elements making up the transmission line are guided in their horizontal travel by pulleys or wheels mounted on the shafts of the same number of alternators that convert the kinetic energy of the pulleys into useful electric power.

The alternators are tied to towers or columns which are vertically supported on the ground and make up the structure supporting the entire plant. In particular, the alternators are mounted on the support towers in such a way that each alternator and its respective pulley lie at all times between the towers and the transmission line, preferably on the part of the towers looking out of the assembly. The size of the pulleys is thus far smaller than using the actual column as a turning axis, thereby minimising the dimensions of the revolution multiplier group and hence the cost of the plant.

Each alternator is devised to be mounted upon the relevant tower through an articulation which allows the alternator and respective pulley to be slightly inclined both when lying idle and working, reducing the friction between the transmission line and the pulley.

Each tower or column has two or more alternators, depending on the system design, arranged on the same side and on the top of the tower, at such a distance that the pulleys on their axes lie at the same height as the relevant flexible lines.

According to the system being described, the blades thrust by the wind travel horizontally along the closed belt. This travel causes the pulleys and consequently the shafts of the alternators mounted thereon to turn, the wind energy being thus converted into electric power.

Now therefore, the system of the invention can be installed anywhere, whatever the geographical conditions of the location, and need not be facing into the wind, as with aerodynamically profiled vertical axis turbines, for the symmetry of the profile and the horizontal travel of the blades cause them to be facing into the wind at all times, thereby eliminating the complex devices required by other systems.

Furthermore, not only need the system not be facing into the wind as explained hereinbefore, but revolutions are regulated by a simple process without sophisticated and very expensive hydromechanical systems being required as in currently operated machines. This regulation takes place by progressively electrically connecting and disconnecting the various system alternators, changing the charge in accordance with the wind strength. This not only expedites revolution control but allows a better use of the wind energy as compared with other systems, for the provision of various alternators allows the power of the generating system to be adjusted to the wind strength from time to time, keeping up an optimum efficiency when the wind acts above or below the rating power for which it has been devised.

A mechanism that is found in all systems is the turbine braking, which acts when the wind rises above a certain velocity, endangering the system. In this design, the belt stops when the wind exceeds the preset velocity and the robot controlling the system activates the brakes.

As for construction, excepting the blades, the remaining elements such as columns, cables, alternators, pulleys, are cheap for they are manufactured in large series for other applications, and the blades are light and simple to manufacture, and hence since they are supported at two or more points of the belt making up the flexible transmission line, and since the points are spaced out proportionally along the blade, the strains to which the wind and centrifugal force submit the blades are shared out. In conventional systems the blades are attached to the axis at one end, and this becomes a bottleneck limiting their size and hence the power generated by such system.

The rest of the system, comprising a computer or robot which together with a number of peripheral means controls the entire system and measuring apparatus, is the usual in all wind stations.

DESCRIPTION OF THE DRAWINGS

In order to provide a fuller description and contribute to the complete understanding of the characteristics of this invention, a set of drawings is attached to the specification which, while purely illustrative and not fully comprehensive, shows the following.

PREFERRED EMBODIMENT OF THE INVENTION

Figure 4:
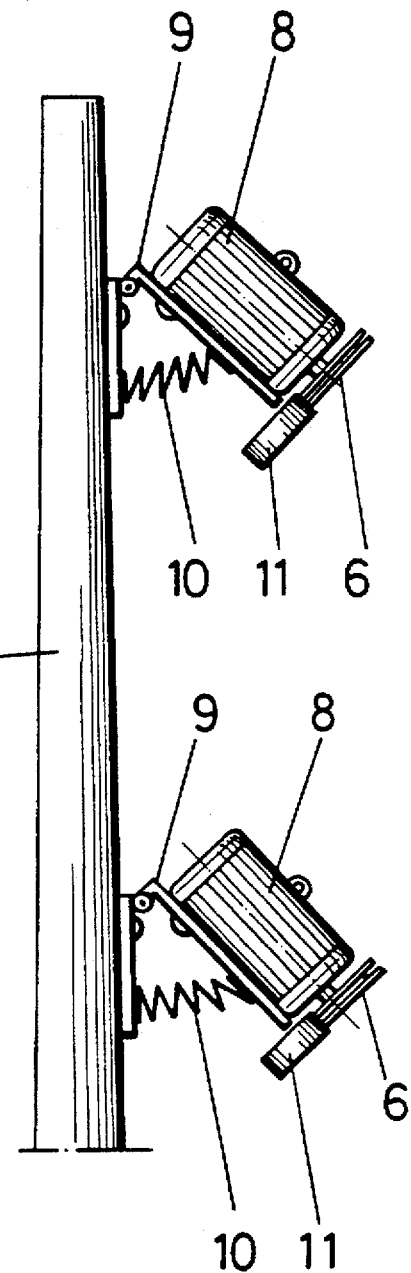
FIG. 4.—Is an articulation device to enable the alternator and pulley to be variously directed in respect of the tower.

With reference to the above figures, the wind system for electric power generation subject hereof comprises a number of towers or columns (1) duly anchored in the ground to form a contour that may be considered to be polygonally or otherwise geometrically shaped, about which runs a transmission line comprising two or more flexible elements, preferably steel cables, generally numbered (2), forming what could be deemed to be a closed belt, and this flexible and closed transmission line (2) thus carries a number of vertical blades (3), i.e. blades lying across the transmission line (2) and being biconvex and symmetrical in shape and attached to the line (2) by means of spacer elements that prevent contact between the blades (3) and the pulleys (6), said spacer elements thus consisting, for instance, of supporting brackets (4) and clamps (5) which are attached to the cables making up the transmission line on the outside, thereby for the inside of the cable to be free to slide within the throat of a pulley (6) fixed at the relevant end to the shaft (7) of an alternator (8) which shall be attached to the relevant tower or column (1) through an articulated support (9) with which the inclination of the alternator (8) and pulley (6) to the vertical can be varied by means of a regulator (10), such as a spring, pneumatic cylinder or the like, as shown in FIG. 4, thereby for both the alternator and the respective pulley to be suitably directed to reduce the friction between the pulley (6) and the transmission line.

Figure 1:
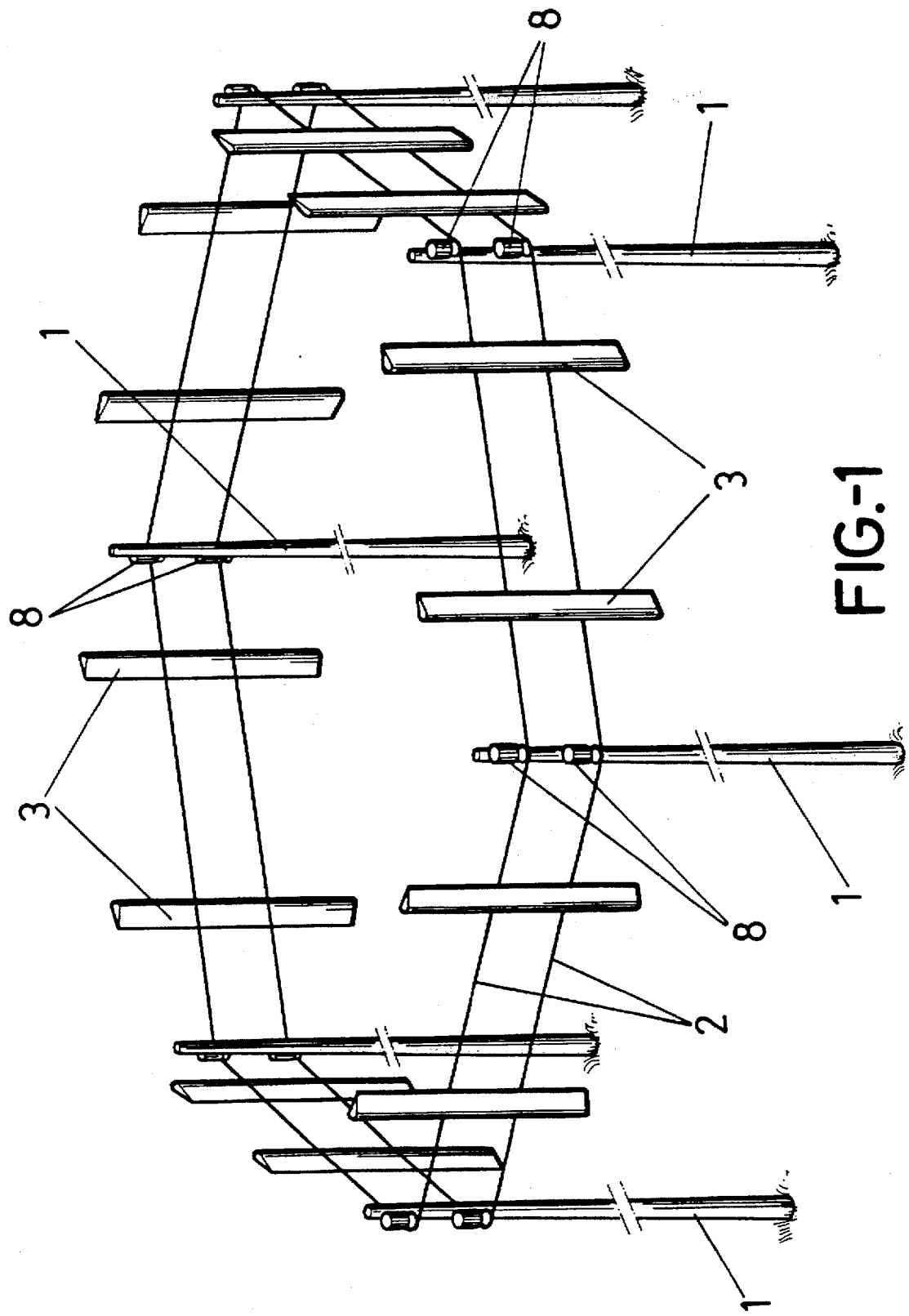
FIG. 1.—Is a schematic general perspective view of the wind system which comprises a plurality of blades mounted on an elastic and flexible transmission line, the latter comprising two cables running horizontally between a number of vertical towers or columns anchored in the ground, the respective alternators being mounted thereon and the biconvex profiled blade being attached to the transmission line.
Figure 2:
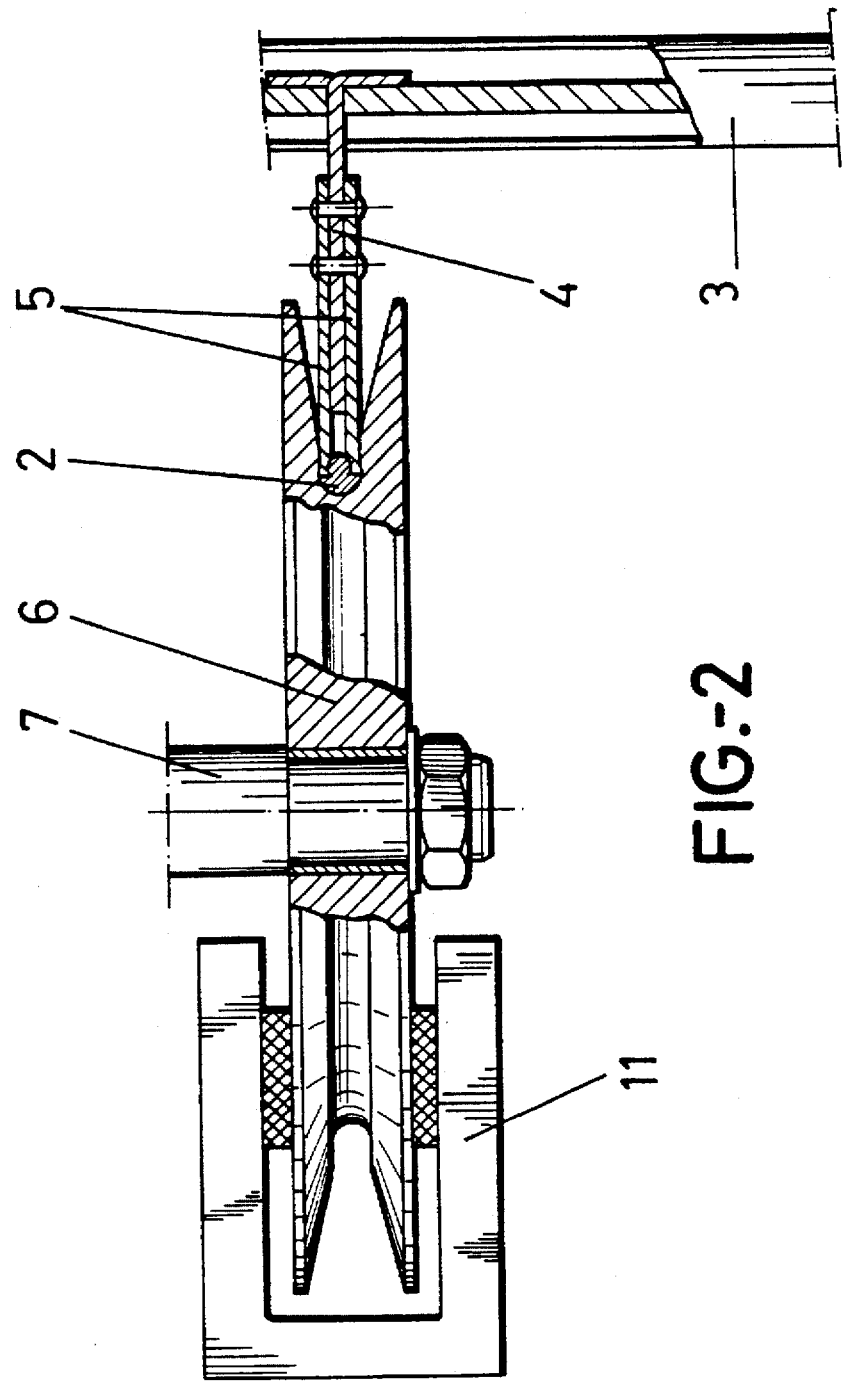
FIG. 2.—Is a detailed section of the assembly with the connection between a blade and the respective alternator shaft.
Figure 3:
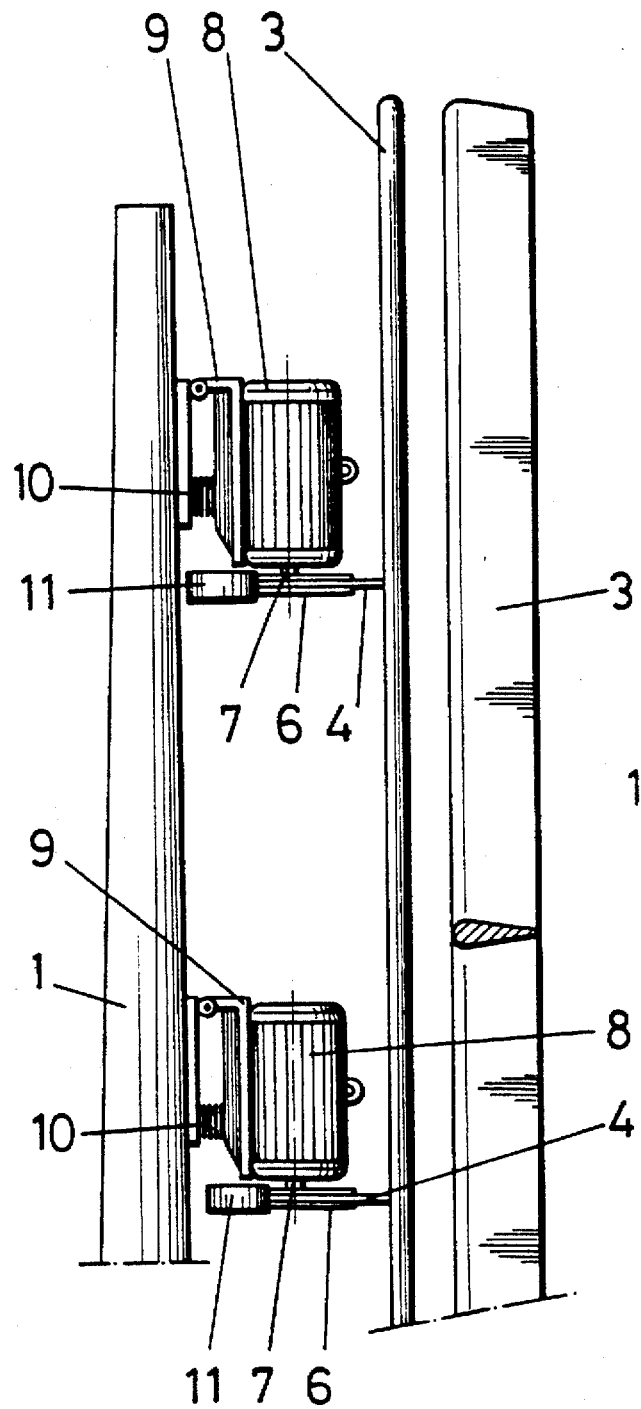
FIG. 3.—Is a side view of the connection between a pair of alternators and the respective blade, this figure showing a side view of the blade with its section in order that its biconvex shape may be observed.

The guide pulley supporting the respective cable of the transmission line (2) is additionally provided with a disc brake (11) as shown in FIG. 2, or a brake inside the alternator.

The cables or elements making up the flexible transmission line (2) to which the blades (3) are fixed through the respective spacer elements (4), are guided in the relevant pulleys (6) mounted directly upon the shafts (7) of respective alternators (8), transferring the energy acquired in the transmission line (2) by the thrust of the blades (3) when the wind impinges upon the same to the alternators (8) proper.

As also explained above, the transmission lines may have any geometric shape whatsoever, provided that they are kept forming a closed belt.

We feel that the description need not be extended any longer for any expert in the art to have grasped the full scope of the invention and the advantages it offers.

The materials, shape, size and layout of the elements may be altered provided that this entails no modification of the essential features of the invention.

The terms used to describe the invention herein should be taken to have a broad rather than a restrictive meaning.

I claim:

1. A WIND SYSTEM FOR ELECTRIC POWER GENERATION, designed to convert wind energy into electric power, and capable of being mounted in any area or location, is essentially characterised by comprising a number of blades (3) transversely connected through their inner face, by means of spacer elements (4), to the outside of a flexible transmission line (2) running horizontally, guided in wheels or pulleys (6), forming a closed belt, the blades (3) being longer than the distance separating the cables making up the flexible line (2), each pulley (6) being provided to be mounted on the shaft (7) of an alternator (8) tied to a tower or column (1) in order for the alternator (8) and pulley (6) assembly to lie between the relevant tower (1) and the flexible transmission line (2) driving the blades (3).

2. A WIND SYSTEM FOR ELECTRIC POWER GENERATION, as in claim 1, characterised because each blade (3) is connected to the flexible transmission line (2) by means of spacer elements (4) comprising a supporting bracket attached perpendicularly to the blade (3), and a pair of clamps (5) tied at one end to the bracket (4), whereas their other end is fixed to the outside of the cable (2), thereby for the inside of the cable to be free to contact with the pulleys (6) upon which it slides.

3. A WIND SYSTEM FOR ELECTRIC POWER GENERATION, designed to convert wind energy into electric power, and capable of being mounted in any area or location, is essentially characterised by comprising a number of blades (3) transversely connected through their inner face, by means of spacer elements (4), to the outside of a flexible transmission line (2) running horizontally, guided in wheels or pulleys (6), forming a closed belt, the blades (3) being longer than the distance separating the cables making up the flexible line (2), each pulley (6) being provided to be mounted on the shaft (7) of an alternator (8) tied to a tower or column (1) in order for the alternator (8) and pulley (6) assembly to lie between the relevant tower (1) and the flexible transmission line (2) driving the blades (3), wherein the alternators (8) are mounted upon the relevant vertical towers or columns (1) by means of articulated supporting means (9) which, together with a regulator (10), allow the inclination to the vertical of said alternators (8) and their respective pulleys (6) to be varied.

* * * * *